(12) United States Patent
Relyea et al.

(10) Patent No.: US 8,522,300 B2
(45) Date of Patent: Aug. 27, 2013

(54) HIGHLIGHT MANAGEMENT FOR FANTASY GAMING

(75) Inventors: Don Relyea, Dallas, TX (US); Brian Roberts, Frisco, TX (US); Heath Stallings, Grapevine, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 944 days.

(21) Appl. No.: 11/859,356

(22) Filed: Sep. 21, 2007

(65) Prior Publication Data

US 2009/0082110 A1 Mar. 26, 2009

(51) Int. Cl.
*H04N 7/16* (2011.01)
(52) U.S. Cl.
USPC .................. 725/135; 725/105; 463/4; 463/5; 463/9
(58) Field of Classification Search
USPC ...................... 463/4, 5, 9; 725/135
See application file for complete search history.

(56) References Cited

U.S. PATENT DOCUMENTS

| | | | |
|---|---|---|---|
| 6,567,980 B1 * | 5/2003 | Jain et al. | 725/61 |
| 6,631,522 B1 * | 10/2003 | Erdelyi | 725/53 |
| 8,028,315 B1 * | 9/2011 | Barber | 725/47 |
| 2002/0049980 A1 * | 4/2002 | Hoang | 725/91 |
| 2007/0100891 A1 * | 5/2007 | Nee | 707/104.1 |
| 2010/0134614 A1 * | 6/2010 | Aman | 348/135 |

* cited by examiner

*Primary Examiner* — Nicholas Corbo

(57) ABSTRACT

A media database stores a number of media content items associated with a real-life field of competitive activity. A user database stores information about a plurality of entities involved in the real-life field of competitive activity, including indications of a number of the plurality of entities that are entities of interest. An event database stores event information identifying an event related to the real-life field of competitive activity, identifying at least one portion of one of said number of media content items as associated with the event, and identifying at least one of the plurality of entities associated with the event. A manager communicatively coupled to the media database, user database and event database, determines whether the event has occurred based on the event information, determines whether the event is associated with any of the number of entities of interest, and generates a highlight message. The highlight message includes an indication of highlight media, where the highlight media is based on the identified at least one portion of said one of the number of media content items associated with the event.

25 Claims, 14 Drawing Sheets

HIGHLIGHT MANAGEMENT FOR FANTASY GAMING

BACKGROUND INFORMATION

Fantasy gaming is a competition among fantasy team owners/managers who are typically participants (i.e., individual persons) in a club or fantasy league organization. Common fantasy games include football, baseball, and basketball, among others. Indeed, any organized competitive endeavor may be modeled in a fantasy game.

Each fantasy team owner selects players from a "real-life" league (e.g., the National Football League), to create a "fantasy" team that will compete with other fantasy teams throughout the season. Player selection is usually performed in an auction or a draft which allows fantasy owners to place valuations on each player for purposes of the fantasy competition. Fantasy team owners can perform various actions with their teams that mimic the actions available to real-life team owners. For example, players may be traded during the season between fantasy owners, players who were not previously selected may be obtained as "free agents," and underperforming players may be "waived".

Once the season starts, fantasy team point accumulation may begin. Each of the players selected may accumulate or take away points from their fantasy team based on their real-world performance. For example, in a football fantasy league, where a player in the real-world makes a touchdown, six (6) points may be given to the fantasy team that has enrolled that particular player. However, if the same player were to throw an interception, minus two (−2) points are given to the fantasy team that has enrolled that particular player. In this way, each of the real-world players contributes to the fantasy team each week of play.

A complication of fantasy games is that each fantasy team typically includes players from multiple real-life teams, which may be engaged in game play simultaneously, at different locations and/or accessible through different transmission services. For example, a typical fantasy football team may include eight (8) or nine (9) starting players from different real-life teams, each of which may be engaged in different live games at the same time. Moreover, it may not be known when during each of the live games the particular team players are engaged in relevant (e.g., scoring related) activity. Accordingly, it is difficult for a fantasy team owner to keep track of the performance of each team member on a substantially real-time basis. Although various web-based services exist which provide for presentation of statistical and/or play-by-play information for sports-related fantasy games, web-based information can be incomplete and/or significantly delayed. Also, web-interface fantasy services do not provide for watching the events (e.g., scoring, fumbling, etc.) take place, which is part of the excitement for the team owner.

BRIEF DESCRIPTION OF THE DRAWINGS

FIG. 10 is an example of a process flow for accessing a highlight video on a mobile device.

DETAILED DESCRIPTION OF THE PREFERRED EMBODIMENTS

Figure 1:
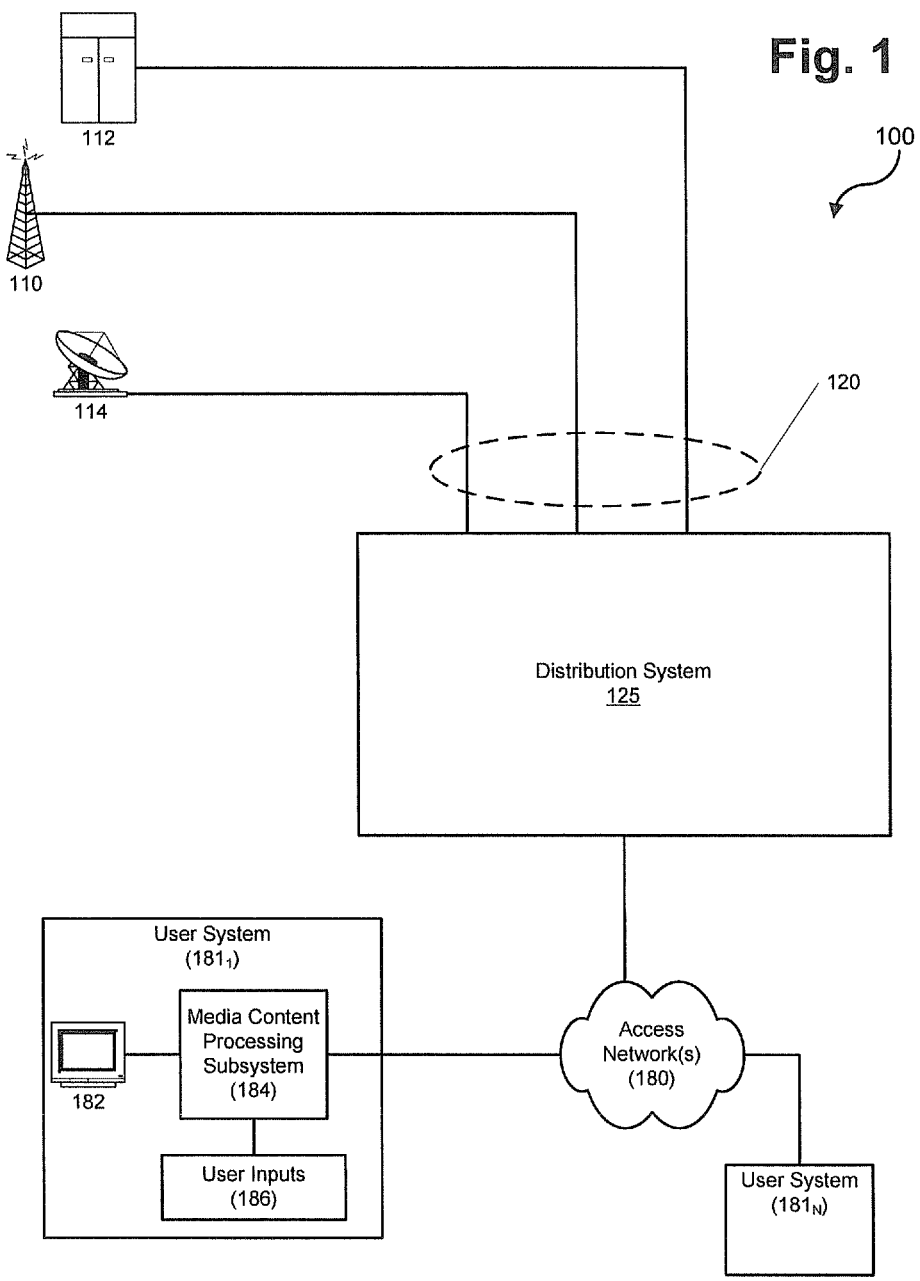
FIG. 1 is an example of a content distribution system.

Referring now to the drawings, illustrative embodiments are shown in detail. Although the drawings represent the embodiments, the drawings are not necessarily to scale and certain features may be exaggerated to better illustrate and explain an embodiment. Further, the embodiments described herein are not intended to be exhaustive or otherwise limit or restrict the invention to the precise form and configuration shown in the drawings and disclosed in the following detailed description.

As discussed herein, "multimedia content" (or simply "media content") is inclusive of audio, video and related data (e.g., metadata, control information, interactive gaming information), whether provided as a stream or in bulk (e.g., a file). As discussed herein, "video" is inclusive of visual imagery (static and moving) and any audio signals and other information signals that may be associated with such video (e.g., an NTSC-formatted transmitted television signal, an MPEG formatted multimedia transmission, closed captioning information, etc.).

Also as discussed herein, "databases" are repositories for information: or content and physically may take the form of one or more storage media which may be incorporated into one or more physical systems (and, in the case of multiple physical systems, may be deployed in a distributed fashion over multiple locations), as is well known. Furthermore, databases may take the form of any well known data model and use any well known underlying technology (e.g., unstructured file systems, flat files, relational databases, object-oriented databases, XML databases, hierarchical structures, etc.). References herein to a "record" or "field" in a database are intended to include information that may be stored across any number of data structures within such models (e.g., tables, objects, files), but may be collectively retrievable using well known data manipulation/querying techniques. Thus, the depiction of data herein as linear/unitary "records" and "fields" is for clarity of description only, and not intended to be limiting.

Also as discussed herein, a "person of interest", "player of interest," "entity of interest" or the like, may include a sports player (e.g., a baseball player, a football player, a coach, a manager, etc.), a group of players (e.g., a team), a "virtual" player (e.g., a virtual avatar, an avatar operating in a virtual/gaming world or a metaverse), or an autonomous entity engaged in game play (e.g., robots in a competition, simulated/computer-controlled player programs. artificial intelligence devices or routines, etc.) In general, a person of interest may include, for example, any identifiable entity engaged in a competitive environment.

Also as discussed herein, "real-word," "real-life" or "real" activity refer to activities engaged in by players of interest in the actual fields of competitive activity that form the basis for the fantasy game. For example, for sports-based fantasy games, the "real-word" would constitute sporting leagues that conduct sporting competitions in which the players of interest participate and accumulate statistics that are used to determine fantasy game performance. As another example, for computer game based fantasy games, the "real world" would constitute the gaming "world" in which the competing entities (e.g., avatars, computer-simulated entities) accumulate statistics that are used to determine fantasy game performance.

The preferred embodiments herein describe a system and method for highlights management and transmission, and in the embodiments shown, as they relate to fantasy gaming. The preferred system and method utilize one or more databases in which are stored various information—real-world player information, fantasy team information associated with a particular user, user preferences/settings, items of multimedia content associated with real-world events (e.g., video content), and "event" information that may correlate at least a portion of the items of media content with a particular playing entity (e.g., an individual player, team). A processing system may then determine whether a "highlight" message should be sent to a user, formulate the highlight message and send the message to one or more devices associated with the user. The message may indicate the presence of new highlight media to the user, which the user may then request for presentation. Alternatively, the message may itself include the highlight media (or automatically cause the user's device to begin playback of the highlight media) without user request. In some embodiments, the processing system may ask the user to upgrade their service package before the user can play highlights.

FIG. 1 shows a preferred content distribution system 100 in which the embodiments described herein may be implemented. Content providers 110, 112, 114 provide multimedia content inputs (e.g., video, audio, gaming data) to system 100. The media content may be in the form of live streams or delayed/bulk delivered content (e.g., "on-demand" content) Providers 110, 112, 114 may be entities that include general content providers (e.g., national broadcasting networks), specialized content providers (e.g., sports networks, financial networks, sports leagues or teams), or simply archival inputs (e.g., tape/digital video disc (DVD)).

The media content inputs from providers 110, 112, 114 may include metadata related to each input. Metadata may be encoded directly into the live feed or recording, or may be separately processed as an input to system 100. The metadata may include information such as the teams playing, date of performance, duration of performance, players active in the game, etc. More detailed metadata may be provided, for example, by an "expert" viewing the event who is inputting information into the media content stream. For example, when a sports player makes a play, the expert may specify metadata such as the team name(s), player(s) and type/result of the play, as well as one or more time indices for the event (e.g., start time, end time and/or duration). The expert may use, for example, an application that allows for specification of such metadata (or automatically generates such metadata, for example, in the case of the time indices). In this way, the expert allows for marking or association of metadata to specific portions of the media content. The expert may be a person, such as a sports announcer or official scorer, that generates the metadata using an application. Alternatively, the expert may be a computer that is programmed to generate metadata based on the media content.

Communications links 120 connect each of providers 110, 112, 114 with distribution system 125. Communications links 120 may include any type of communications channel that allows for the flow of content to distribution system 125. Moreover, communications links 120 may include a combination of different physical communications facilities that may include, but is not limited to, digital transmissions elements, analog transmission elements, wired, wireless, and optical transmission mediums, as is Well known.

Distribution system 125 receives the media content from each provider 110, 112, 114 and distributes the media content to access networks 180. Distribution system 125 may include a number of well-known elements, such as electrical, optical and or wireless networks, routers, switches, multiplexers, demultiplexers, encoders, decoders, compressors, decompressors, etc., for delivery of video content in analog and/or digital format. Distribution network 125 may also include facilities for bi-directional transmission of media content, for example, in Internet Protocol format. In the preferred embodiment, the distribution system 125 is the Verizon® FIOS TV distribution system.

Access networks 180 may include any network or networking technology, including: packet-switched networks (e.g., Ethernet, Internet Protocol, Asynchronous Transfer Mode), cable television networks (e.g., hybrid fiber-coax network), wireless networks (e.g., a satellite broadcasting network, terrestrial broadcasting network, wireless communications network, wireless LAN), telephone networks (e.g., the Public Switched Telephone Network), a provider-specific network (e.g., a TiVo network), an optical fiber network (e.g., a Passive Optical Network), or any other suitable network or combination of networks. In the preferred embodiment, the access network 180 includes at least one of the Verizon® FiOS network and the Verizon Wireless® wireless network.

One or more user systems 181 are connected to access network 180. Each user system 181 generally includes a media content processing subsystem 184, a display 182 and a user input device 186. An exemplary media content processing subsystem 184 may include any combination of hardware, software, and firmware configured to process media content. As used herein, the term "media content processing subsystem" refers expansively to all possible receivers that receive and process digital and/or analog media content. Hence, an exemplary media content processing subsystem 184 may include, but is not limited to, a set-top box ("STB"), home communication terminal ("HCT"), digital home communication terminal ("DHCT"), stand-alone personal video recorder ("PVR"), DVD player, video-enabled phone, gaming platform, and personal computer (e.g., a home theater PC ("HTPC")).

Media content processing subsystem 184 includes interfaces for receiving audio, video, and data from access network 180, and may be configured to process received media content, including causing the media content, or one or more components thereof (e.g., video, audio and/or data components), to be presented for experiencing (e.g., viewing) by a user. Media content processing subsystem 184 may use any suitable technology or technologies to receive media content from access network 180, including using a tuner to receive the media content, using demodulating, decoding and/or demultiplexing facilities, and using decompression and/or rendering facilities. Media content processing subsystem 184 may further include interfaces for output of media content to presentation devices for experience by the user (e.g., viewing, listening). For example, the media content processing subsystem 184 may provide a signal to a display device 182 (e.g., a television, computer monitor, a mobile phone display, etc.) so that the display device 182 may present (e.g., display) the media content for experiencing by the user.

Figure 6:
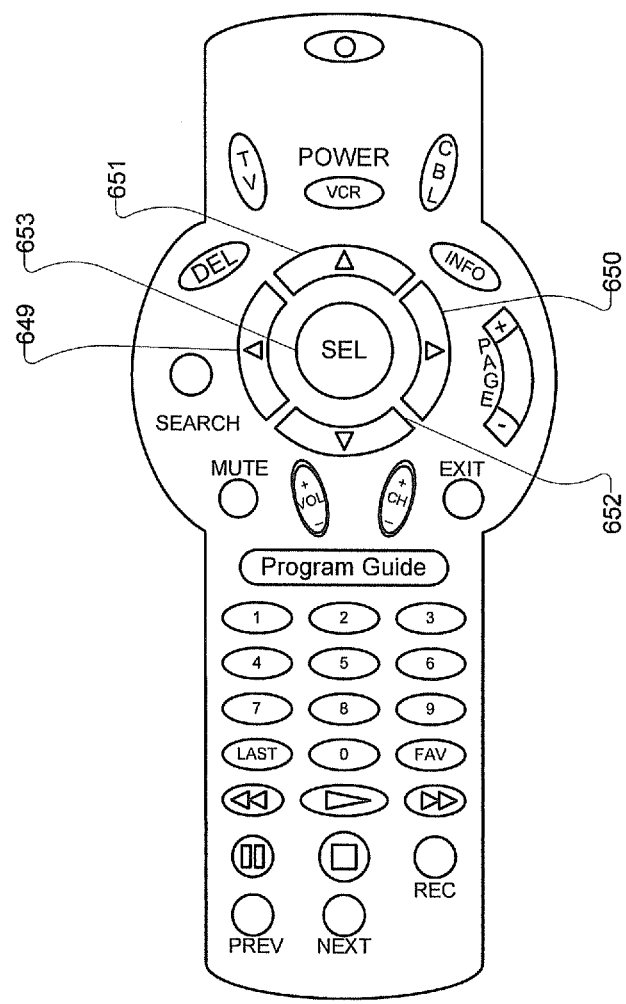
FIG. 6 is an exemplary user input device for use with the system of FIG. 1.

Media content processing subsystem 184 may also include interfaces for receiving user inputs via user input device 186, allowing the user to control and provide information to media content processing subsystem 184. Such interfaces may be wired or wireless. An exemplary input device 186 is shown in FIG. 6 in the form of an wireless remote control for controlling display of video content provided either live or from recording. For example, a left button 649, right button 650, up button 651, down button 652, and select button 653 may be included and configured to enable the user to navigate through various channels of media content, views and graphical user interfaces displayed by the display device 182. It will be recognized that input device 186 shown in FIG. 6 is merely illustrative of the many different types of user input devices that may be used in connection with the present systems and methods. For example, other types of input devices may be used for user input(s) 186 including, but not limited to, remote controls, keyboards, touch screens, and/or discrete button inputs.

In the preferred embodiment, media content processing subsystem 184 includes an interactive program guide facility and a digital video recorder (DVR) facility. The interactive program guide facility may be configured to receive program guide information from access network 180 and display program guide information, such that the user can navigate and select desired media content. The DVR facility allows users to record media content. The integrated program guide facility and DVR facility may be configured such that a user may use the program guide to select media content for recording, determine which media content has been designated for recording and display the media content that has already been recorded.

While an exemplary user system 181, user inputs 186, display 182, and media content processing subsystem 184 are shown in FIG. 1, the exemplary components illustrated in FIG. 1 are not intended to be limiting. Indeed, additional or alternative components and/or implementations may be used.

Figure 2:
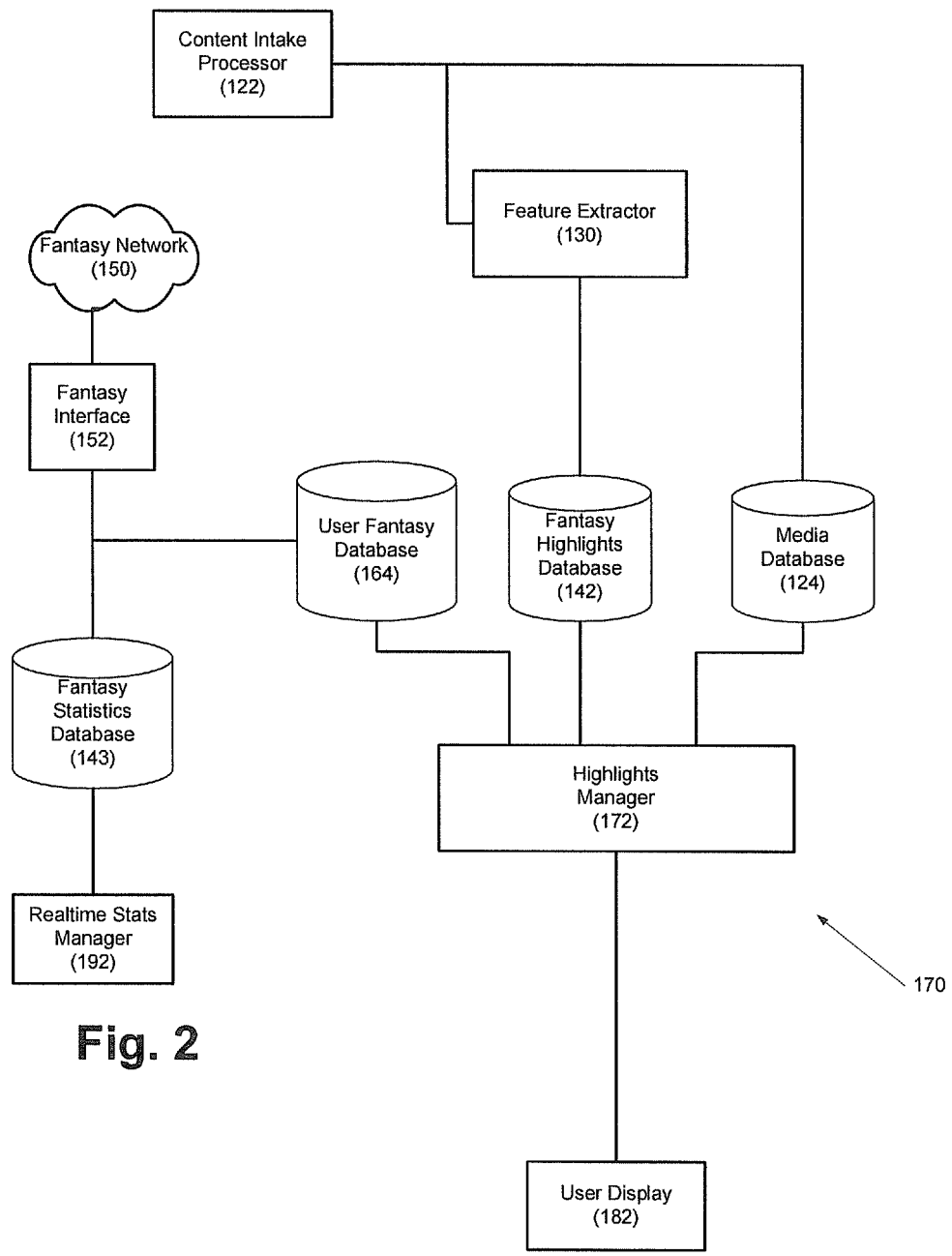
FIG. 2 is an example of a preferred embodiment of a fantasy highlights facility system.

FIG. 2 shows an exemplary implementation of a fantasy gaming highlight facility system 170, according to a preferred embodiment. Highlight system 170 may be integrated within distribution system 125 (see FIG. 1), media content processing subsystem 184, or both (with components thereof distributed across distribution system 125 and media content processing subsystem 184 as desired). The preferred highlights facility 170 includes a content intake processor 122, a feature extractor 130, a media database 124, a fantasy highlights database 142, a user fantasy database 164 and a highlights manager 172 (a fantasy statistics database 143 and a real-time statistics manager 192 may also be present in some embodiments, and are described further below in reference to FIG. 15). Content intake processor 122 generally receives media content from content providers and stores the media content in media database 124, typically with a unique identifier or code for each item of media content in order to facilitate later recall. The media database 124 may include both the stored items of media content and related information, such as the name or title of the item of content, the type or format of the content, the genre of the content, or other classification data associated with the content. Feature extractor 130 may receive the media content (and any metadata provided by provider 110, 112, 114), perform operations to extract the relevant metadata, and populate fantasy highlights database 142 with event information. Fantasy highlights database 142 may contain information related to players and events, such as records including sections for a player identifier, a team identifier, a date, a time, a media index (which may correlate to a particular item of media content), an event start time, an event duration, an action type (e.g., a run, a pass, a touchdown, an interception, as basket, or a goal), and other fantasy game-related metrics and/or statistics. User fantasy database 164 is generally a repository for information about users and their particular fantasy players and teams, which may be populated, for example, from information provided by fantasy service provider 150. The information in user fantasy database 164, fantasy highlights database 142 and media database 124 may then be used by highlights manager 172 to generate highlight messages for distribution to users. Further details and examples of the implementation and operation of the preferred highlights facility 170 (and some variations thereof) will be further described below.

Referring again to FIG. 2, content intake processor 122 may coupled (e.g., via distribution system 125) to content providers to receive the multimedia content provided by each provider 110, 112, 114. Processor 122 may be embodied as a single system or may be embodied as multiple systems each performing independently or in concert with others. For example, for each different type of provider 110, 112, 114 (or different type of media content), multiple content processors 122 may be used. Alternatively, only a single content processor 122 may be used for any combination of providers 110, 112, 114 or media content. Content intake processor 122 may also include a firewall and authentication protocols for each provider 110, 112, 114 to prevent receipt of false video and/or metadata, and may include facilities to perform additional formatting/processing on the media content to facilitate use in system 170 (e.g., decoding/decompressing, normalization, etc.).

Figure 3A:
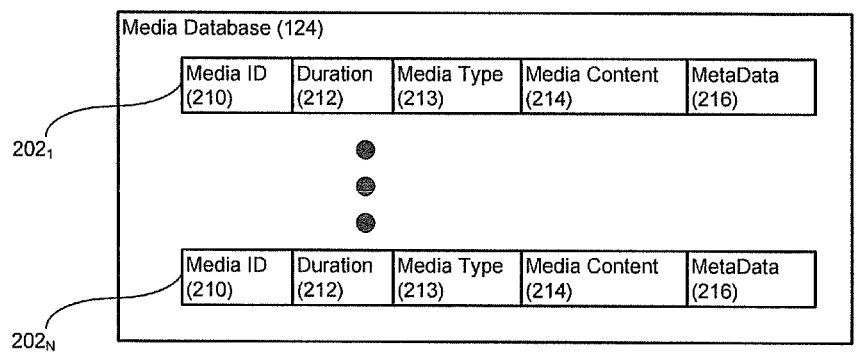
FIG. 3A is a partial record view of an exemplary media database for use with the system of FIG. 2.

Turning to FIG. 3A, an exemplary media database 124 is described in greater detail. Media database 124 is configured to store items of multimedia content and their related information and may comprise a plurality of records $202_1$-$202_N$. A record, such as record $202_1$, may include media data such as a media content identifier 210, a duration 212, media content field 214, and metadata 216. Media content identifier 210 is a unique identifier for each item of media content stored in the media database 124, thus allowing each item of media content to be individually accessed. The item of media content itself is stored in media content field 214, which may be digital in the case of hard-disk-type storage, or analog/digital in the case of tape-type storage. The item of media content may contain media related to only a portion of the real-world activity or it may contain media related to the entire activity (for example, an entire sporting match).

Duration 212 describes the length of stored media content 214 and may be useful for system management activities (e.g., determining whether the correct clip was identified, how much time is required to load the entire clip, how much bandwidth is required to transport the clip, etc.). Media type 213 describes the type and/or format of the stored media content 214. For example, media type 213 may indicate what formatting is used to encode/decode the stored media content 214 (examples being MPEG-1, MPEG-2 and MPEG-4 encoded video, or proprietary coding/rendering schemes which may be used with computer gaming). Metadata 216 include additional information about stored media content 214, which may include, for example, the game type (e.g., football, basketball, baseball, etc.), team names, player names, camera locations/identifiers, etc. Metadata 216 may be a copy of the information from providers 110, 112, 114 (see FIG. 1) including the teams playing, date of performance, duration of performance, and players active in the game, etc. However, metadata 216 may also include additional or enhanced information determined after being processed by system 100 (for example, by feature extractor 130, further described below).

In the preferred embodiment, media database 124 may, receive queries to extract at least a portion of stored media content 214. The query may include a media content identifier, as well as a start time index and end time index (or duration) such that, for example, a five second highlight media segment is sent out in response to the query, (rather than an entire performance), which is more desirable for the end user who is looking for focused information about a specific event. Such a system is efficient for transmission bandwidth purposes, although requires additional processing at the media database 124. Alternatively, the system could be configured such that all or a substantial portion of the stored media content is transmitted in response to a query, and the determination of the portion of the media content to provide to user is done using downstream/intermediary systems, should such an arrangement be more functional/cost effective.

Figure 3B:
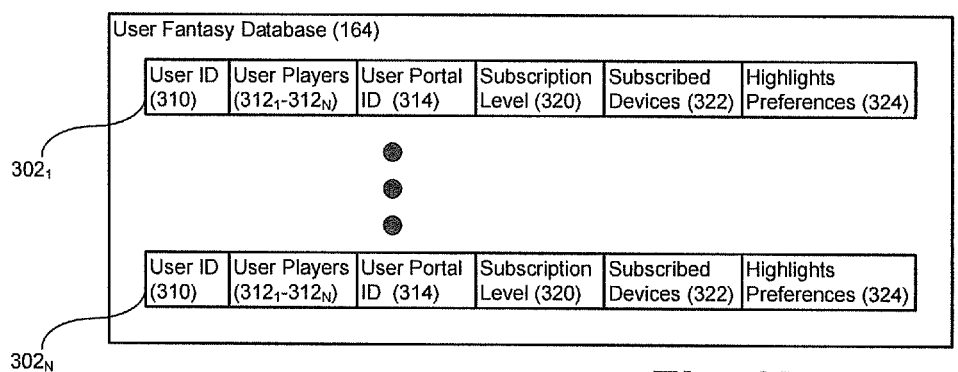
FIG. 3B is a partial record view of an exemplary user fantasy database for use with the system of FIG. 2.

Turning to FIG. 3B, an exemplary user fantasy database 164 configured to store fantasy team data is illustrated. The exemplary user fantasy database 164 comprises a plurality of records $302_1$-$302_N$, each of which may include a user identifier 310, user players $312_1$-$312_N$, a user portal identifier 314, a subscription level 320, subscribed devices identifiers 322 and highlights preferences 324. User identifier 310 is preferably a unique identifier or code assigned to each user and allows an index into user fantasy database 164. User players $312_1$-$312_N$ are a plurality of unique player identifiers, which may be used to identify which real-world entities (e.g. individual players, teams) are associated with a particular user's fantasy team, or which the user may have an interest in monitoring. User portal 314 may specify a particular fantasy service provider 150 (further described below) which the user is using to play the fantasy game, as well as other information associated with the user's account at the fantasy service provider 150 (e.g., user id, password, team name, league name, etc.).

Subscription level 320 describes the subscription "package" or depth of programming available to the user, either in general or specific to the highlights facility. Examples may include a "local" package where only local games of interest are available for viewing. Alternatively, there may be regional or unlimited subscriptions. The regional subscription may allow a user to access media content associated with a particular geographic region, while the unlimited subscription would, for example, provide a user with access to all media content at any time. Subscription level 320 may be used by other portions of system 170 for determining whether to send a highlight message, or whether to permit the user to obtain access to the highlight by upgrading subscription level 320.

Subscribed devices field 322 may include one or more devices (e.g. media content processing subsystems) to which the user prefers to have information sent when available, and a preferred message format. For example, the subscribed devices may include a digital video recorder (DVR) device, a video terminal, a set-top box (STB) for use with a display device (e.g., a television), a mobile telephonic device or other handheld device, a pager, a computer or laptop, and/or an electronic mail or message service, each of which may be associated with the user (and for which addressing information can be stored). Each device may specify different permitted message types, based on device capabilities. For example, in the case of a mobile phone, some phones may only accept text messages (and some networks may only support text messages), while more sophisticated mobile phones/networks may allow for full streaming video. Moreover, DVR devices and STB devices may allow for automatic viewing of video (e.g., via a "pop-up window"), which may be preferable to requiring a text message (and response). Users may also specify message preferences for different devices or in general, based on time of day or type of device (e.g., send messages to mobile phone after 6 pm and on weekends).

Highlights preference 324 may include information indicating user preferences related to the highlights facility 170, which are discussed further below.

Figure 4:
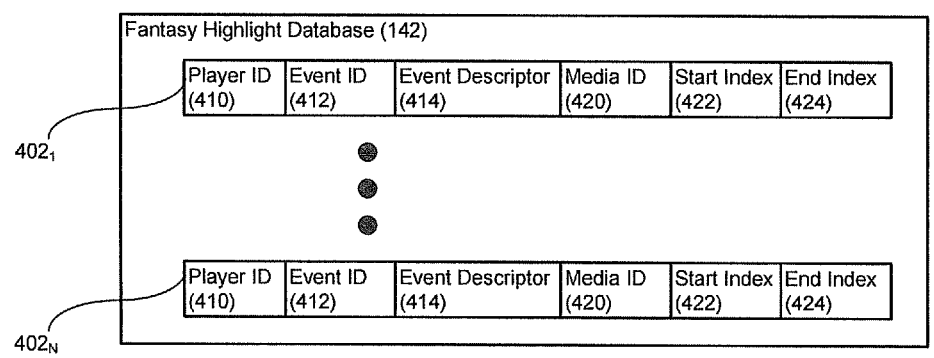
FIG. 4 is a partial record view of an exemplary fantasy highlights database for use with the system of FIG. 2.

Turning to FIG. 4, an exemplary fantasy highlights database 142 is shown. Fantasy highlights database 142 may comprise a plurality of records $402_1$-$402_N$, which may include information such as player identifiers 410, event identifiers 412, event descriptors 414, media identifiers 420, start index 422 and end index 424. Player identifiers 410 may uniquely identify real-world entities (e.g., individual players, teams). The unique identifier assigned for each player identifier 410 may also be used above in user player fields $312_1$-$312_N$ of user fantasy database 164 (see FIG. 3B), thus allowing for correlation between the two repositories such that, for example, highlights manager 172 can associate information in fantasy highlights database 142 with particular players associated with a user's team, as specified in user fantasy database 164.

Event identifiers 412 may be used to identify different "player events" that have been identified in system 170. In the preferred embodiment, each identifier assigned to event identifier 412 is unique so that the records $402_1$-$402_N$ can be uniquely identified within system 170. Event description field 414 provides metadata about the event. For example, event description field 414 may include identifiers for the type of game played, the type of event that occurred (e.g., a score, a penalty, etc.), a points identifier (in the case where the event type is a score), etc. Media identifier 420 is used to map the media content stored in media database 124 to the event identifier 412 (e.g., media identifier 420 may be correlated to media identifier 210 in media database 124).

A start index 422 and an end index (or duration) 424 may be used to allow for only a selective portion of an item of media content to be allocated to event identifier 412. For example, where an item of media content stored in media database 124 is the entirety of a sporting event, start index 422 and end index 424 may be used to limit the portion of such media content that is mapped to event identifier 412. Such a system allows for media content for entire length real-world contests to be stored in media database 124, while the numerous events related to each player (e.g., score or penalty) is indexed into each item of media content 214. This allows for less fragmented storage of media content as well as avoiding the possibility of duplicate storage of the same media content (which, in the case of video content, may be a significant storage savings). As an example, numerous events 412 may be given unique identifiers but overlap in time (e.g., reference the same ten seconds of the same video content). For example, a record $402_1$ associated with an offensive player may be for an event where the offensive player scored points, while at the same time another record $402_2$ associated with a defensive player may be for an event where the defensive player received negative points for underperforming on the same play. Thus, each event may be unique to the player and their particular situation in the game, but does not require multiple content storage. Along similar lines, in some embodiments, an event identifier may be correlated to multiple player identifiers, such that duplicate event records are not needed when multiple players are involved in the same event.

Turning back to FIG. 2, feature extractor 130 may be used to identify and make available media content that does not include detailed metadata for highlight processing. Where an item of media content is determined not to include metadata information (or to be missing certain metadata), feature extractor 130 may employ expert system techniques, such as optical character recognition (OCR), image recognition, speech recognition and/or text searching, that allow feature extractor 130 to build the appropriate metadata for an item of media content that was not provided with metadata. For example, feature extractor 130 may reference a roster for each team depicted in the media content in order to associate player names with jersey numbers and/or positions. Feature extractor 130 may then determine through image recognition if, for example, a touchdown was made or a penalty was assessed. Moreover, OCR may be used to verify and detect scoring activity based on textual graphics displayed in video (including closed-captioning information), as well as reading the jersey number and name of the player credited with the score. Speech recognition may be used to determine events based on "play-by-play" announcements, and text search may be used against closed-captioning data provided with video. Alternatively (or in combination), each item of media content not including metadata may be manually transcribed by a person.

Once feature extractor 130 has obtained metadata related to an item of media content, the metadata is formatted and input into fantasy highlights database 142. In an example, where an item of video content includes Player X, fantasy highlights database 142 is updated to include records 402 for events involving Player X depicted in the video content, the records 402 including the player identifier for Player X, the unique identifier for the video content (correlated with the media identifier in media database 124), an event identifier 412 and a start index 422 and duration 424 useful to extract the portion of the video content that is relevant to the event involving Player X. In some embodiments, an entry may be made into fantasy highlights database 142 only when certain events are detected involving a player (e.g., when a minimum point threshold is reached, when certain actions are performed, etc.). In this way, fantasy database highlights 142 may be kept free of minutia. Alternatively, fantasy highlights database 142 may be made as comprehensive as possible, with event filtering activities performed by downstream system elements (for example, highlights manager 172).

Referring again to FIG. 2, system 170 may be connected to a fantasy service provider 150 which provides access to fantasy sports information related to a particular user. Fantasy service provider 150 may be part of the organization that provides system 100 and/or system 170, or may be a separate entity. Fantasy service provider 150 may provide the underlying game logic and/or statistical information used in playing the fantasy game, and may also provide user interfaces that permit users to perform control actions with respect to their fantasy teams. Where fantasy service provider 150 is the same organization that is providing systems 100/170, the underlying game logic and user control interfaces may be integrated into the elements of system 100 (e.g., a menu-type display on a set top box (STB) that allows a user to enter their fantasy gaming selections).

A fantasy interface 152 provides an interface to fantasy service provider 150 in order to receive information from and/or transmit information to fantasy service provider 150. In some embodiments, fantasy interface 152 includes security facilities and may perform data verification (e.g., where fantasy service provider 150 is a third-party and the connection is through a public network). For example, a user may be using a partner web-based fantasy gaming site that operates a fantasy football game. In this case, fantasy interface 152 will retrieve periodically (or at set times, such as immediately before the start of game play) the information related to that user's fantasy team (e.g., a current roster, currently active players) and populate user fantasy database 164 with such information. The current roster will allow system 170 to identify highlights of interest to that user, as is explained below in more detail. In one alternative, where tighter integration is achieved between fantasy service provider 150 and fantasy interface 152, a facility may be available that automatically sends modifications/updates registered at fantasy service provider 150 to fantasy interface 152 on a real-time basis.

System 170 further includes a highlight manager 172 which correlates fantasy information for each user from user fantasy database 164 with data provided to fantasy highlights database 142. In this way, highlight manager 172 can determine which teams and/or players are interesting to the user and whether those teams and/or players have had any events occur that merit sending a highlight message. Highlight manager 172 may do periodic polling of fantasy highlights database 142 for new events associated with entries in user fantasy database 164. Alternatively, events from fantasy highlights database 142 may be provided to highlight manager 172 periodically or upon receipt to avoid polling. Highlight manager 172 may also be configured to determine which types of events are of interest to particular users. For example, a user may specify as part of the highlight service an "event scope," which identifies types of events that are of interest for highlight transmission purposes. Thus, a user may specify that all events should generate a highlight message transmission, or some subset of events (e.g., scoring related) should generate a highlight message transmission. User highlight transmission preferences may be stored, for example, in user fantasy database 164 as highlights preferences 324.

Once highlight manager 172 has determined that a user's fantasy team and/or player has a highlight to transmit, a highlight message is composed and sent to the user that includes information related to the highlight. The highlight message may come in many forms, including a short messaging service (SMS) message to a mobile device, an e-mail including links to downloadable file containing media content, streamed media content to a mobile device, set-top box or personal computer, program listing information for a digital video recorder (DVR), etc. The format of the highlight message may be dependent on the user's preferences as to the type of highlight messages to provide, the type of device to receive highlight messages and the subscription level of the user.

For each highlight message that is to be sent, highlight manager 172 assembles the appropriate message. For example, in the preferred embodiment, highlight manager 172 uses the information stored in the event record associated with the event—e.g., the media content identifier, start time index, and end time index/duration values—to retrieve the corresponding portion of the identified media content from media database 124 to create an item: of highlight media. Where more than one highlight is to be sent, highlight manager 172 may combine all of the highlight media into a single presentable item or leave them separate for selective presentation, recording or deleting. Alternatively, rather than provide an actual item of highlight media content, highlight manager 172 may provide a message that includes information which may be used to retrieve each highlight media item. For example, the highlight manager may construct a link (e.g., a URL) that allows access to the highlight media, or may specify information that allows for identification of the highlight media (e.g., the media content identifier, start/end times, etc.). Highlight media may be cached by the highlight manager 172 (for example, in a quickly accessible storage system) to allow for quick access for presentation to the preferred devices of users.

The message sent from highlight manager 172 may be proliferated through access network 180 to the user's preferred media content processing subsystem device 184 for receiving highlight messages. In one embodiment, an application running on the user's device 184 detects the receipt of a highlight message. The application may then present to the user a display element that indicates that a highlight is available, and permit the user to indicate a desire to play the highlight media. The display element may provide certain information related to the highlight (e.g., player involved, event type, teams involved, etc.). Alternatively, the application may play the highlight media automatically subsequent to receipt of the message, without positive user interaction. Where the highlight media is not provided as part of the message, the device may obtain the highlight media using the information provided in the message (e.g., a URL, method invocation). Playback of the highlight media may be in various formats depending on the type of media, including as full screen video, split screen video, "picture-in-picture", "voice over" audio, etc.

In another embodiment, the highlight message may be sent to a recording facility associated with the user's media content processing subsystem (e.g., a DVR), which may store (or download for storage) highlight media for later playback. For example, the DVR may receive a highlight message with one or more URLs for highlight media, and use the URLs to download highlight media to the DVR's storage facilities.

In some embodiments, the highlight message may comprise a collection of highlight media—for example, over the course of a single day or week—which may be provided for presentation/storage. In these cases, the highlight message may contain a listing of the highlight media items associated with the highlight message, allowing the user to select particular items of highlight media content to view/record.

In some embodiments, not all highlight media may be provided to the user depending on the user's current subscription level. For example, if the user does not have a subscription to a content provider that has provided a particular item of media content, the user may not be able to see highlight media generated from the media content. As another example, the user's subscription level may not provide for watching video-type media content via wireless networks (or wireless networks that are not affiliated with system 100 and/or system 170). Additionally, when highlight media are forwarded to other users (described below), the subscription level of the other users may not allow for accessing such highlight media. In such cases, the user may be asked if the user wishes to upgrade his or her subscription level to access the highlight media. In one embodiment, when a display element is provided as a result of the receipt of a highlight message, if the user's subscription level is not sufficient to access the highlight, the display element may include the ability for the user to obtain a higher subscription level. This information may be sent to the highlight manager 172, which could then grant access to the highlight media.

In some embodiments, a user may be given a temporarily high subscription level as a "teaser" so they can enjoy highlight media as an enticement to upgrade their subscription level. For example, highlight manager 172 may identify a user as a good candidate for receiving the highlight service (or receiving content from a particular content provider), and may periodically send a highlight message to the user which allows for limited access to highlight media related to the user's fantasy team (with an opportunity to buy an upgraded subscription). Alternatively, highlight manager 172 may provide a "redacted" highlight message that does not provide access to media (or permits access to only portions of media), but indicates that highlight media is available if the user upgrades their subscription level.

Figure 5:
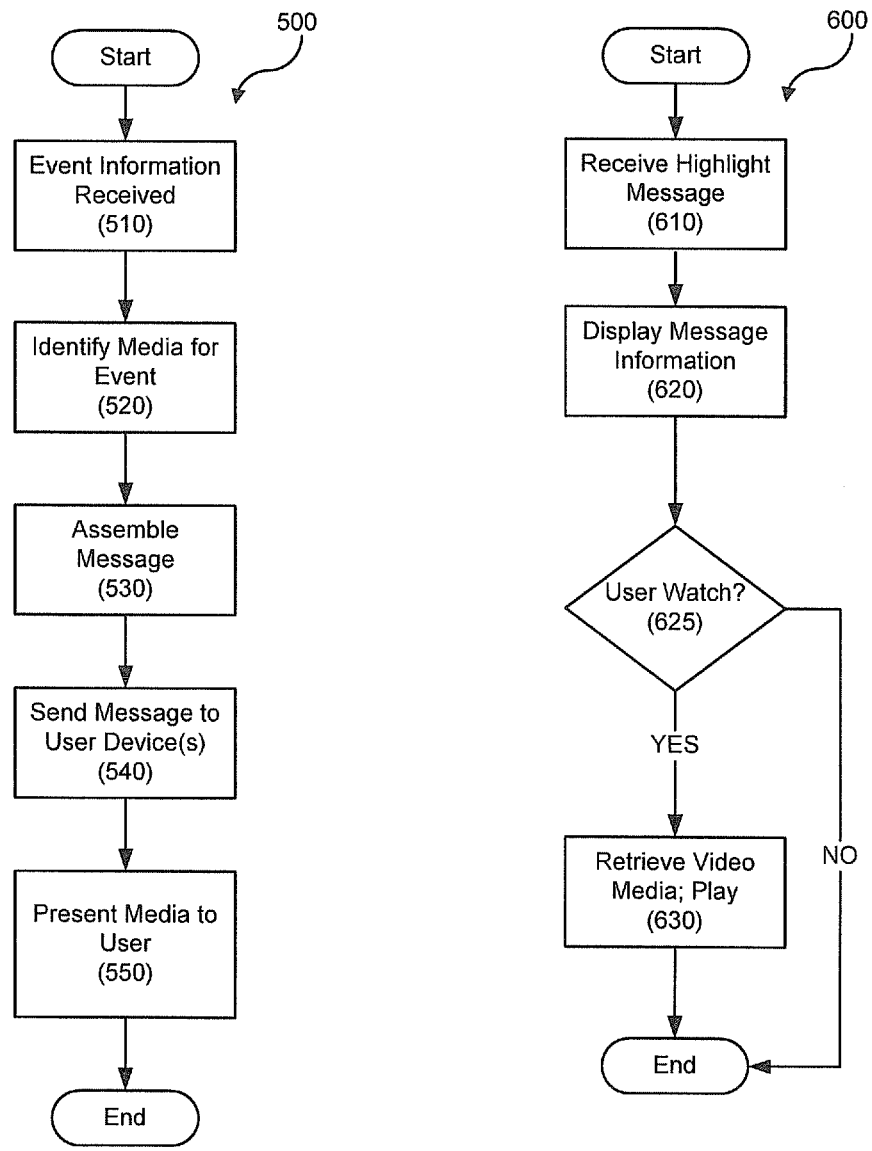
FIG. 5 is an example of a process flow for generating and sending a highlight message.

FIG. 5 is an exemplary process flow 500 for assembling and sending an item of highlight media. The process begins at step 510, which involves receiving notification of an event that according to the current system settings will generate a highlight message. As noted above, highlight manager 172 may be configured to periodically query fantasy highlights database 142 for event records that may be applicable to a particular user's fantasy team, or fantasy highlights database 142 may be configured to automatically notify highlight manager 172 when new event records are stored. A determination may be made, based on the user's highlight settings, whether a highlight update message should be sent. For example, it may be determined whether the event is associated with a player on the user's fantasy team, whether the event is one that the user has specified is one that should generate a highlight message (e.g., it is within the event scope), and whether the event has an item of media content associated with it. Other actions that may generate a highlight message can include a change to user fantasy database 164 that indicates a change to the team roster (e.g., because different players are being watched) and a change to the user's highlight settings (e.g., because more events now are considered "highlight worthy"). When it is determined that a highlight message should be sent, control proceeds to step 520.

At step 520, highlight media that is relevant to the event generating the highlight is identified from media database 124. In the preferred embodiment, the source media content is identified by the media content identifier 420 stored in the record of fantasy highlight database 142 for the event identifier 412 associated with the event (see FIG. 4). The highlight media position and duration within the source media content may be determined by using start index 422 and end index 424 also stored in fantasy highlight database 142 (see FIG. 4). Additional seconds of content on either the beginning and/or end of the highlight media may be added to allow for an improved viewing experience to give the play context and/or suspense. Control then proceeds to step 530. In some embodiments, the highlight media is retrieved from media database 124 and stored by highlight manager 172, for example, in a cache storage area, such that it may be quickly provided to users.

At step 530, a message is assembled, which may include an electronic-mail message, a text message, an instant message, a custom formatted message, etc. The message may contain the highlight media itself (which may include digital rights management (DRM) so that the highlight media may not be proliferated widely and/or to provide copy protection due to contractual requirements with content providers 110, 112, 114), or alternatively, the message may provide a link or method to access the highlight media content.

In addition to the highlight media, other related information may also be added to the message so that the user understands what the highlight relates to. For example, the message could include the text "PLAYER X, just scored 20 points. Would you like to watch or record for later viewing?" Such a message allows the user to understand that this is related to a particular player on the user's fantasy team, the result (e.g., points scored), and gives the user an option to watch/record the highlight media. Control then proceeds to step 540.

Figure 11:
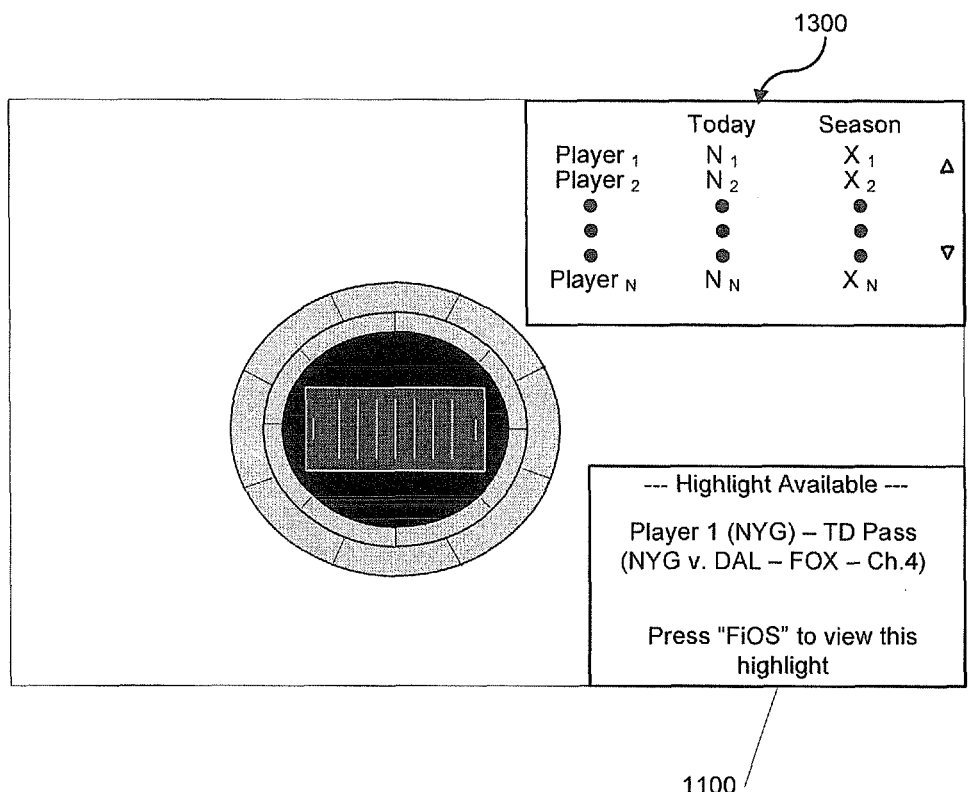
FIG. 11 is an example of a highlight notification screen, the context of a user display.
Figure 12:
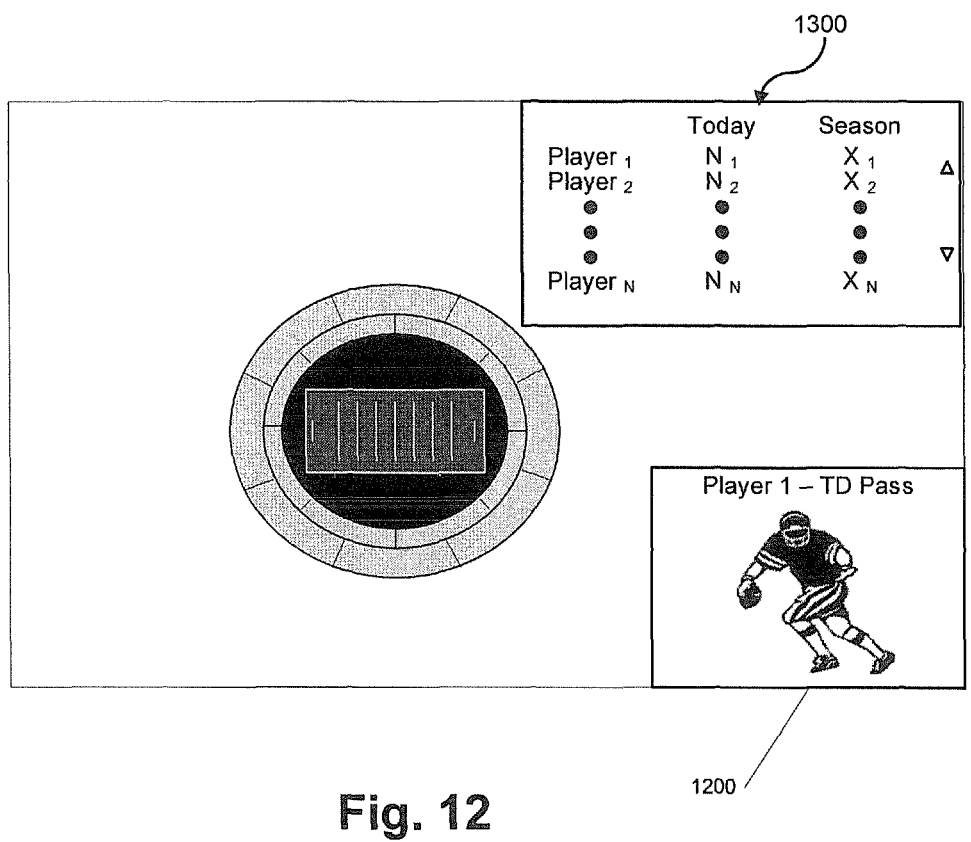
FIG. 12 is an example of a highlight playback screen, the context of a user display.

At step 540, the message is sent to one or more of the user's media content processing subsystem devices 184. The device may be selected based on user preferences (for example, indicated in the user fantasy database 164). The device may then display an element that notifies the user that highlight media is available, request a response indicating that the user desires to access the highlight media, or automatically play the highlight media (step 550), depending on the user's preferences or device's capabilities, as described above. FIG. 11 illustrates one example of the display of highlight message information. Highlight notification screen 1100 may be displayed, for example, in the corner of content currently being displayed by a user display 182. In this example, the user is requested to provide feedback to start highlight media playback (e.g., pressing a key on the input device 186). Alternatively, the highlight media may be played automatically. FIG. 12 illustrates one example of the playback of highlight media. Highlight media screen 1200 shows the media (in this example, video) played back, for example, in a corner of content currently being displayed by a user display 182.

FIG. 10 is a process flow 600 for one example of reviewing highlight media in the form of a video clip on a media content processing subsystem 184 that is a mobile device. The process begins at step 610 where the mobile device waits to receive a highlight message. When a highlight message has been detected, control proceeds to step 620.

At step 620, the mobile device provides a display to the user indicating the presence of a message and what the message relates to. For example, the display may include text such as "Your new player this week, PLAYER X, just scored 20 points." The display may also prompt the user to indicate whether or not the user wishes to watch the highlight video clip now. For example, the display may include the text "Would you like to watch now? Press #." In step 625, if the user indicates a desire to watch the highlight video clip (in this example, by pressing the "#" key on the mobile device), control proceeds to step 630.

At step 630, the highlight video is retrieved. In this example, in order to conserve bandwidth over the wireless network, the highlight video clip is not transmitted with the highlight message, but rather the mobile device sends a request to the highlight manager 172 to obtain the highlight video. The request may include identification information for the highlight video (which may have been included in the highlight message received by the mobile phone), such as a unique identifier for the highlight video. Upon receipt of the request, the highlight manager 172 retrieves the highlight video based on the identifier (e.g., from a cache storage) and provides the highlight video to the mobile device. In this example, the highlight video is streamed to the mobile device. The process then ends.

Figures 7, 8:
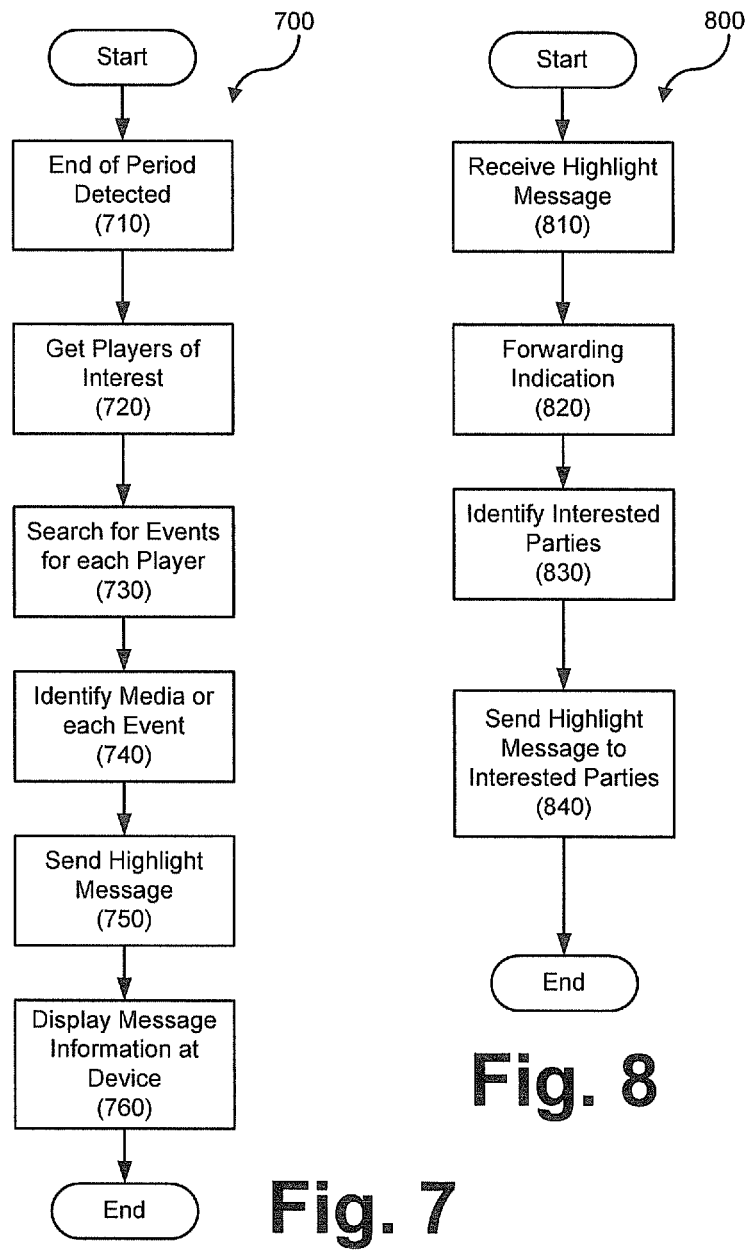
FIG. 7 is an example of a process flow for sending periodic compilation highlights.
FIG. 8 is an example of a process flow for forwarding highlight messages to other interested parties.

In some embodiments, the highlight facility may support a periodic highlight generation process. For example, highlights may be provided at the end of a period, and may contain a compilation of a number of events that have occurred during the period. This may be a preferable highlight delivery option to certain users that do not want to be constantly sent highlight messages. FIG. 7 is an example of a periodic highlight compilation process flow 700. The process begins at step 710, which determines whether the end of the period has occurred. The period used (e.g., daily, weekly, monthly) and end of the period may be set as desired, and may depend upon the real-world activity on which the fantasy game is based. As an example, for a fantasy game based on college football, the period may be weekly and the end of the period may be Sunday at 5 AM. As another example, for a fantasy game based on Major League Baseball, the period may be daily and the end of the period might be 3 AM. In any case, when the end of the period is detected, control proceeds to step 720.

At step 720, the user's players of interest are retrieved. This may be performed by querying user fantasy database 164 to determine user players $312_1$-$312_N$. However, fantasy network 150 may also be queried to determine if any changes were made during the period that should be included in the highlight compilation. Control then proceeds to step 730.

At step 730, a search for associated events is performed within fantasy highlight database 142 for each user player $312_1$-$312_N$. The search may include limitations as to threshold ("highlight worthiness") and timeframe (e.g., only events occurring within the period should be retrieved) Control then proceeds to step 740.

At step 740, the highlight media for each event are identified. Identification may be as described above. In the case of periodic highlights, multiple highlight media may be combined into a single instance of highlight media, for example, on a per-player basis, or for all highlights in the period. Such combined instances of highlight media may be uniquely identified and cached by highlight manager 172 for easy retrieval. Control then proceeds to step 750.

At step 750, a highlight message is sent to the user's preferred media content processing subsystem device 184 indicating the existence of the highlight media. The user's device may be configured to display the highlight message information (step 760), for example, indications of each of the individual media items or each of the compilation highlight media items (or a combination thereof), and may allow for the user to select one or all items for access/recording. The process then ends.

In some embodiments, users may be able to forward highlight media to other parties. For example, users may wish to forward highlight media to other users that may be engaged in the same fantasy game, or to friends that are interested in the performance of the user's fantasy team. FIG. 8 is an example of a process flow 800 for forwarding highlight media to third parties. The process begins at step 810, where a user receives a highlight message and has obtained access to highlight media via the highlight message, such as according to the processes described above. The highlights may be individual players, or events, or they may be a compilation (such as described above and in FIG. 7). The user may indicate a desire to forward the highlight media (Step 820). Forwarding may be facilitated by an interactive display element that permits the user to indicate a desire to forward the highlight, and to receive information related to forwarding (see below)

At step 830, the user indicates one or more other interested parties to whom the highlight should be forwarded. These are typically other users engaged in the fantasy game, but in some embodiments could include any third party. The user may be prompted to provide an address at which the interested parties can be messaged, for example, where the interested parties are not users of system 170 (or system 100). Once the other interested parties are identified, a message is sent to the highlight manager 172 indicating the forwarding request, the highlight media and the identification of the other interested parties.

At step 840, the highlight manager 172 may provide the highlight message to each of the identified parties. In the case of identified parties that are users of system 170 (or system 100), providing the highlight message may be by determining the appropriate addressing information for the identified parties' preferred media content processing subsystem devices 184 and sending the highlight message in a manner similar to that described above. For identified parties that are not users of system 170 or system 100, highlight manager 172 may perform additional steps to ensure delivery of the highlight message, such as determining the type of address information provided for the identified parties (e.g., email address, text message address, instant messaging address, uniform resource identifier, etc.) and format a highlight message accordingly.

Figure 9:
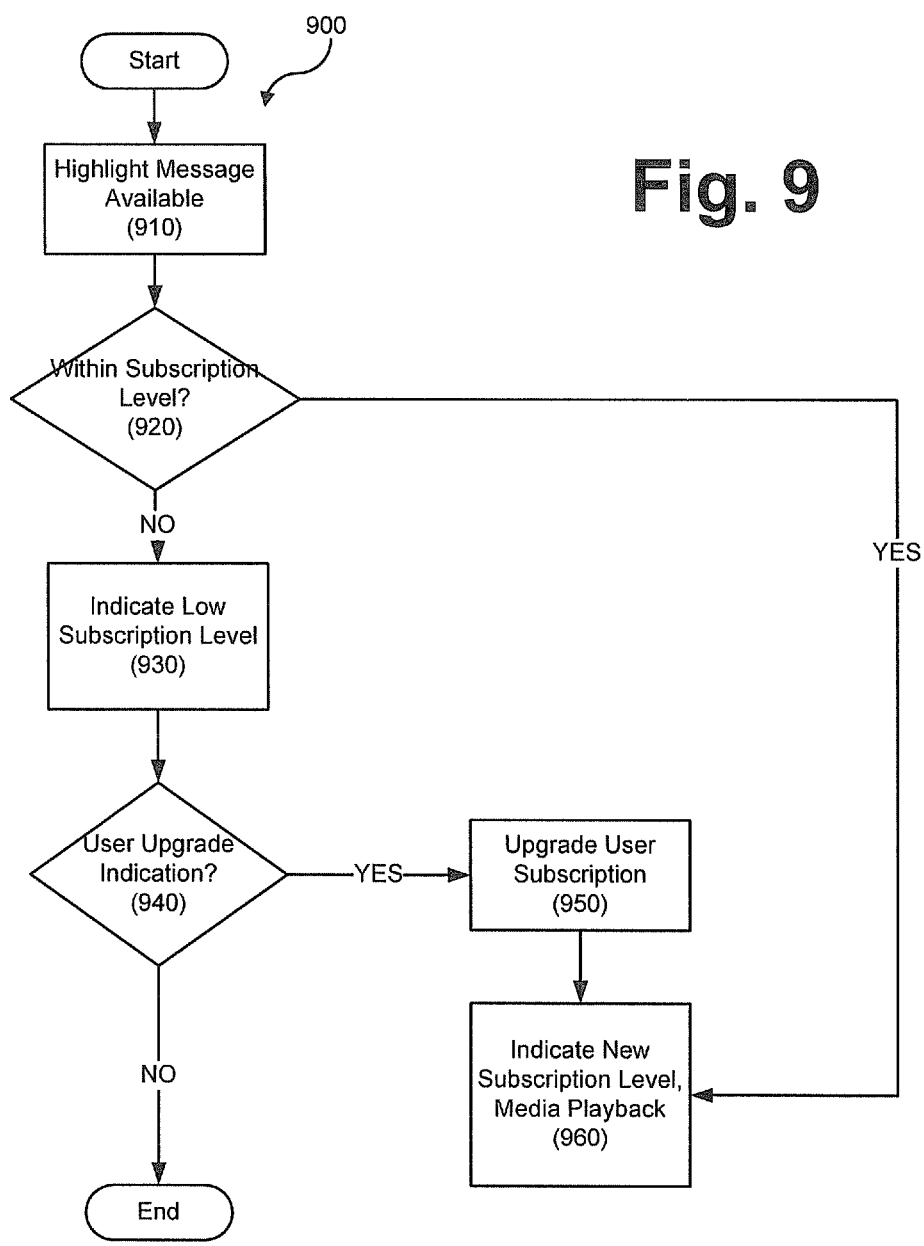
FIG. 9 is an example of a process flow for allowing users to upgrade their subscription levels to obtain access to highlight media content.

As noted above, in some cases a user receiving a highlight message may not have a subscription level that enables the user to access the highlight media. In some embodiments, a facility may be provided that allows the user to obtain a higher subscription level in order to gain access to unavailable content. FIG. 9 is an example of a process flow 900 in which users are able to upgrade their subscription level if certain highlight media is unavailable to them. The process starts at step 910, where it has been determined that a highlight message should be generated for a user's fantasy team. This may be according to the processes described above.

At step 920, the user's subscription level is checked against the source media content that is used to create the highlight media. As an example, when it is determined which item of media content is associated with an event for a highlight, highlight manager 172 request that the user's subscription level be checked for appropriate access rights. This check may be performed through a query to distribution system 125 (which may maintain records that associate user subscription levels and content access permissions) or may be performed without such a query (e.g., where the subscription level itself indicates whether the content is included, where the metadata associated with the source media content includes an indication of the subscription level required for access, etc.). If the source media content is within the subscription level of the user, the highlight message may proceed to the user, for example, as described above. If at least one of the source items of media content that will be used to generate the highlight media is outside the user's current subscription level, control proceeds to step 930.

At step 930, an indication is provided to the user that particular items of highlight media are not available to the user due to an insufficient subscription level. The indication may be by marking the unavailable content with an indicator. The indication may also take the form of a text message to the user as part of the highlight message that one or more of highlight media is not available due to the user's low subscription level. (e.g., "Highlights for Player X are not available to you, as you do not have a subscription to Content Provider Y."). The message may also give the user the opportunity to "upgrade" their subscription level in order to access the game content. The message may include the cost and terms of any available upgrades (for example, a one-time upgrade may have a one-time cost, a permanent upgrade may have a recurring subscription cost), and may permit the user to select which of the unavailable highlight media the user wishes to obtain.

If the user indicates a desire to request an upgrade (step 940), in step 950, the user's upgrade request is sent to distribution system 125 for processing. The request may be included in a message to system 125, which may cause the system 125 to access customer records associated with the user to ensure proper billing authorization and to set appropriate subscription level information. In step 960, a response from distribution system 125 may then indicate the new subscription level, and the highlight manager 172 may notify the user of the ability to now access previously unavailable highlight media. System 170 may accordingly update the user's subscription level 320 in user fantasy database 164.

In some embodiments, a real-time statistics facility may also be included in system 170, such that fantasy statistics can be presented to the user while the user is viewing content. Providing such statistics allows the user to track the progress of players and/or teams in real-time both for entertainment purposes (e.g., to monitor performance against other fantasy sports owners' teams) and also allows the user to make viewing decisions based on the real-time statistics (such as viewing certain highlights of greater importance to the fantasy competition). As one example of such a system, FIG. 2 includes a real-time statistics manager 192, which provides real-time or near real-time information to user system(s) 181 regarding the current status and points standings of the user's fantasy team and/or individual players. Real-time statistics manager 192 may be in communication with a fantasy statistics database 143, which in this example stores statistical information related to the performance of players of interest relative to the fantasy game. In other embodiments, real-time statistics manager 192 and fantasy statistics database 143 may be combined in a single entity or with other entities within system 170, and may be located within distribution system 125, user systems 181, or a combination of the two. For example, in some embodiments, fantasy statistics database 143 could be combined with fantasy highlights database 142.

Figure 15:
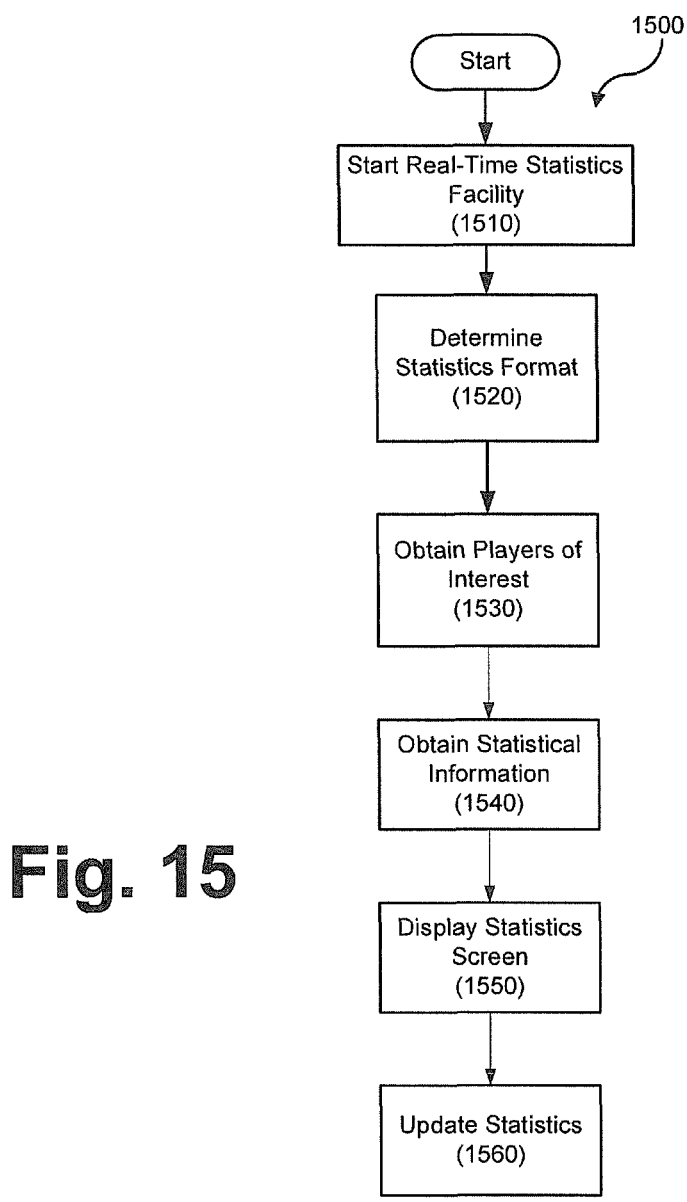
FIG. 15 is an example of a process flow for reporting real-time statistics for use with the system of FIG. 2.

FIG. 15 illustrates an example of a process 1500 for providing a real-time statistics facility to users. In step 1510, a request is received to provide the real-time statistics facility. The request can come in multiple forms. In one arrangement, the user can provide an input via input device 186 that requests the statistics facility (e.g., through a dedicated button on input device 186 or an interface provided through media content processing subsystem 184). In other arrangements, the real-time statistics facility may be automatically requested, for example, in connection with a viewing schedule facility, such as that described in co-pending U.S. application Ser. No. 11/859,316, entitled "CONTENT SCHEDULING FOR FANTASY GAMING," filed the same day as the present application, the contents of which are hereby incorporated herein by reference in their entirety. In step 1520, it may be determined in what format the real-time statistics should be presented. In the preferred embodiment, the user can have real-time statistics presented just for players of interest associated with the user's team, for players of interest of the user's team and another team's players, or aggregated statistics for multiple teams. If no selection is made, the format may default to one of the available formats (e.g., players of interest only). The selection may also be made after initial display of a particular format—the user may indicate a desire to change formats, or such change may occur automatically (e.g., after a period of time).

In step 1530, real-time statistics manager 192 communicates with user fantasy database 164 to retrieve fantasy player information. Real-time statistics manager 192 may communicate with user database 164 to retrieve the user's fantasy players $312_1$-$312_N$ and, where formats have been selected that include other teams, the fantasy players from those other teams. In step 1540, real-time statistics manager 192 obtains statistical information from fantasy statistical database 143 associated with the fantasy players identified in step 1530. For example, real-time statistics manager 192 may obtain an initial set of statistical information from fantasy statistical database 143, and may thereafter receive updated statistical information (e.g., at the time of updates to fantasy statistical database 143 or at regular intervals). Examples of such statistics can be measures of performance of players (e.g., yards accumulated, runs scored, points, targets hit), points related to fantasy play (e.g., +6 for touchdown, +3 for field goal) and the status of a player (e.g., playing, not playing, injured).

Figure 13:
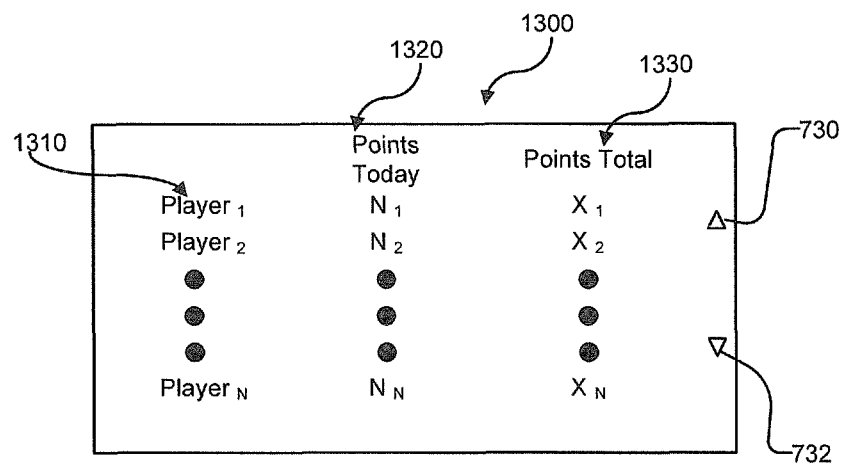
FIG. 13 is a first example of a screen including real-time statistical information.

In step 1550, a real-time statistics display is provided to the user. The display can take many forms, and may be dictated by the format selected (see Step 1520). One example of a real-time statistics display is shown in FIG. 13. Screen 1300 may be used to show real-time information about particular players of interest for various time periods—for example, today, the current week, and/or for an entire season. In screen 1300, players are listed in a player column 1310 on the left of screen 1300 and identified by their player names (e.g., $Player_1$-$Player_N$). A "points today" column 1320 indicates the points attributed to each player listed in player column 1310. A "points total" column 1330 indicates the total points for the season for each player listed in player column 1310. Screen 1300 may be displayed, for example, in a corner of a display 182, such that currently viewed content may continue to be viewed, such as illustrated by FIG. 11. Screen 1300 may be displayed in conjunction with screens provided from time-to-time by the highlight facility, such as screen 1100 illustrated in FIG. 11 and screen 1200 illustrated in FIG. 12.

Figure 14:
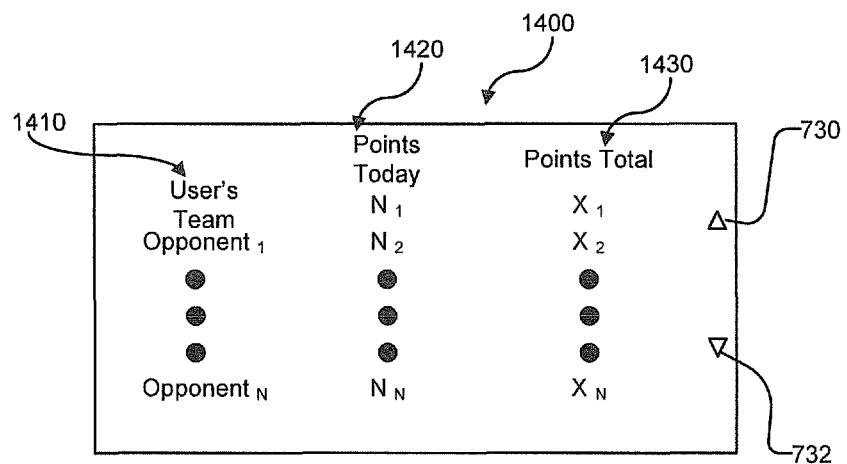
FIG. 14 is a second example of a screen including real-time statistical information.

Another example of real-time statistics display screen is show in FIG. 14, which shows a screen 1400 that includes real-time information about a user's team as compared to the user's opponents. A team column 1410 shows the user's team as well as the user's opponents (e.g., $Opponent_1$-$Opponent_N$). A "points today" column 1420 indicates the points accumulated today for each team in team column 1410. A "points total" column 1430 indicates the total points for each team in team column 1410. Team column 1410 may be organized in any manner including the user's team at the top, alphabetically, or by "points today" 1420, or "total points" 1430. As with screen 1300 (see FIG. 13), screen 1400 may be displayed, for example, in a corner of the display 182, such that currently viewed content may continue to be viewed.

Figure 16:
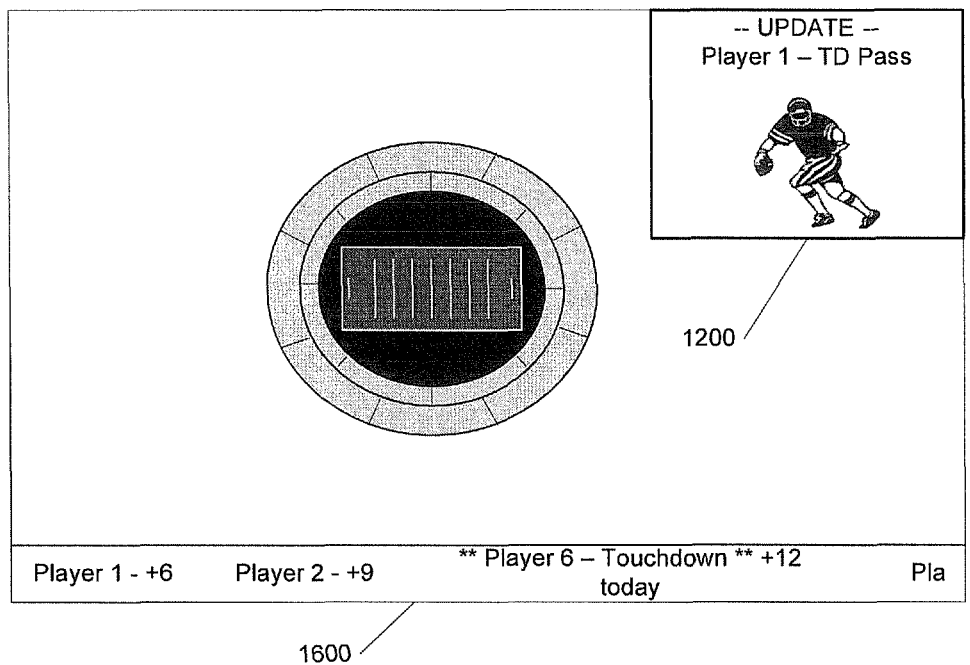
FIG. 16 is a third example of a screen including real-time statistical information.

Another example of a real-time statistics display screen is show in FIG. 16, which shows a screen 1600 that includes a "ticker" (e.g., a scrolling display) that provides statistical information. In this example, statistical information related to player and/or team performance can be shown. For example, the ticker may show current statistical information for players and/or teams (e.g., "Player X—6 points today, 30 points this week", "Team Y—50 points today"), and can show the most recent updates (e.g., "Player X—touchdown, +6 points"). Screen 1600 may be positioned, for example, at the bottom of display 182, to allow the user to continue to view the currently displayed content (as well as any highlights screens that may from time-to-time be displayed, such screen 1200 as illustrated in FIG. 16).

In step 1560, the contents of the real-time statistics display are periodically updated. As described above, the real-time statistical manager 192 may receive updated statistical information from fantasy statistical database 143. This updated information may be presented in the real-time statistics display, according to the format and layout of the display. For example, in the example of screen 1300, when a statistical update indicates that a player's points have changed, the "points today" 1320 column and "points total" 1330 column entries for that player may be updated. Likewise, if the updated information indicates that a team's points have changed, the entries for the team in screen 1400 may be updated appropriately.

Figure 17:
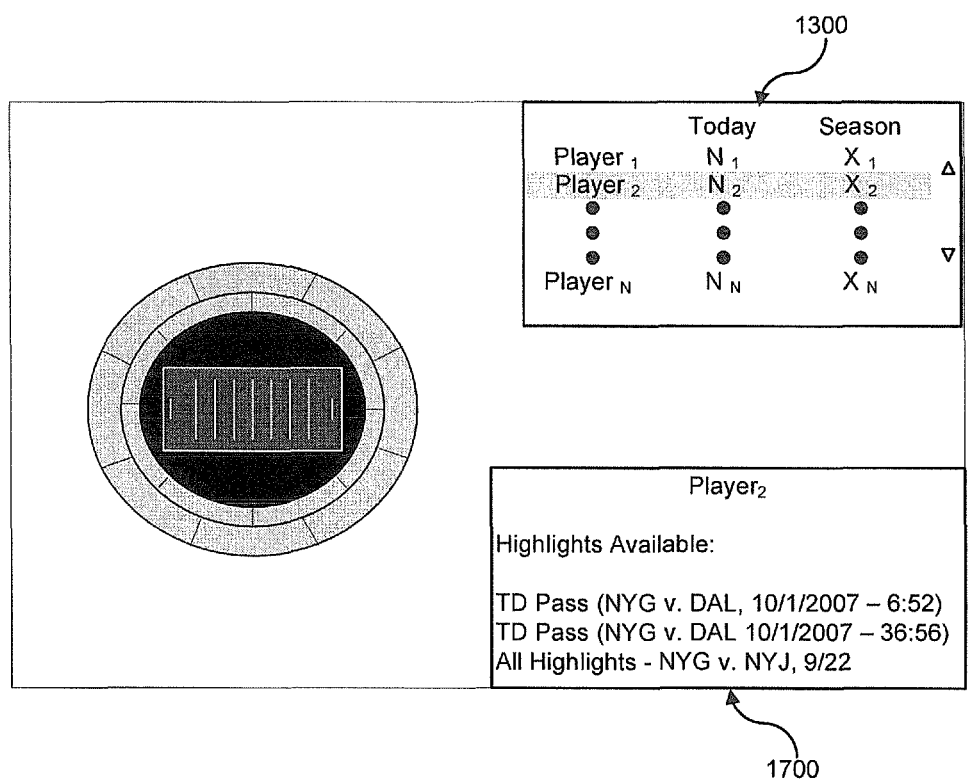
FIG. 17 is an example of a display including real-time statistical information and detailed player information.

In some embodiments, the real-time statistics facility may provide users with the ability to obtain additional information through the real-time statistics display by selecting the displayed entries. For example, a user might select a particular player from player column 1310 on screen 1300 using input device 186, in which case the real-time statistical facility can retrieve more detailed information concerning the player, such as news, status, more detailed statistical information. In some embodiments, the detailed information can include obtaining highlights that are available for playback via the highlights facility. FIG. 17 shows an example of a user interface which allows a user to access highlights in this manner. As shown, the user is able to highlight certain players of interest in screen 1300. The detailed information associated with highlighted player (in this example, "$Player_2$") may be shown in another screen 1700, including listings for various highlight media available for playback. The user may use the input device to select an item of highlight media, and the highlight playback screen 1200 may then be displayed (see FIG. 12) displaying the highlight media content. Similar details might be made available through the selection of team entries in screen 1400, or the selection of a team entry may cause the real-time statistical display to switch to screen 1300 to provide details regarding the players comprising the selected team.

Conclusion

With regard to the processes, methods, heuristics, etc. described herein, it should be understood that although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes described herein are provided for illustrating certain embodiments and should in no way be construed to limit the claimed invention.

The processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media (also referred to as a processor-readable media). Such media may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

It is to be understood that the above description is intended to be illustrative and not restrictive. Many embodiments and applications other than the examples provided will be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

The use of the singular articles such as "a," "the," "said," etc. should be read to recite one or more of the indicated elements unless a claim recites an explicit limitation to the contrary. The use of "coupled" in describing a relationship between two entities should be read to mean the ability of the two entities to exchange information in the manner contemplated and as well known, and encompasses the use of intervening elements (e.g., networks, interfaces, conductors, data structures, methods, etc.), and does not require physical contact, proximity or direct connection, unless otherwise specified.

What is claimed is:

1. A system comprising:
  a media database that stores a plurality of media content items associated with a plurality of sporting events;
  a user database that stores information about a plurality of players involved in the plurality of sporting events, including an indication of one or more players of interest to a user that are included in the plurality of players;
  an event database that stores event information identifying an event related to one of the sporting events and a portion of a media content item included in the plurality of media content items as associated with the event;
  a feature extractor coupled to the event database that
    uses optical character recognition to identify textual graphics disposed on a jersey that is displayed within the identified portion of the media content item,
    determines, based on the identified textual graphics, an identity of a player involved in the event, and
    generates metadata for the identified portion of the media content item, the metadata representative of the identity of the player involved in the event; and
  a manager coupled to the event database and the feature extractor, and that
    determines, based on the metadata, that the player involved in the event is included in the one or more players of interest, and
    generates a highlight message including an indication of highlight media, the highlight media including the identified portion of the media content item, wherein the highlight message causes a user device associated with the user to automatically begin playback of the identified portion of the media content item without the user requesting the playback to begin.

2. The system of claim 1, wherein the event information includes a unique media identifier associated with the identified portion of the media content item.

3. The system of claim 2, wherein the event information includes a start index associated with the identified portion of the media content item and one of a duration and an end index associated with the identified portion of the media content item, and wherein the manager generates the highlight message based on the unique media identifier associated with the identified portion of the media content item, the start index, and one of the duration and the end index.

4. The system of claim 1, wherein the plurality of media content items include video media content, and the highlight media includes video media content.

5. The system of claim 1, wherein the indication of highlight media includes at least one of an identifier for the highlight media, metadata associated with the highlight media, and the highlight media.

6. The system of claim 1, wherein said manager sends the highlight message to the user device.

7. The system of claim 6, wherein the user device is at least one of a mobile device, a set-top box, a digital video recorder, a gaming platform and a personal computer.

8. The system of claim 1, further comprising:
  a fantasy network interface configured to receive fantasy information from a fantasy service provider, the fantasy information related to the plurality of players.

9. The system of claim 1, wherein the manager is configured to determine whether a user has a sufficient subscription level to access the identified portion of the media content item, and to include in the highlight message an indication of an insufficient subscription level when it is determined that the user does not have the sufficient subscription level.

10. A method comprising:
  storing a plurality of media content items related to a plurality of sporting events in a media database;
  storing information about a plurality of players involved in the plurality of sporting events and an indication of one or more players of interest to a user that are included in the plurality of players in a user database;
  identifying a portion of a media content item included in the plurality of media content items as associated with an event related to one of the sporting events;
  using optical character recognition to identify textual graphics disposed on a jersey that is displayed within the identified portion of the media content item;
  determining, based on the identified textual graphics, an identity of a player involved in the event;
  generating metadata for the identified portion of the media content item, the metadata representative of the identity of the player involved in the event;
  determining, based on the metadata, that the player involved in the event is included in the one or more players of interest;
  generating a highlight message including an indication of highlight media, the highlight media including the identified portion of the media content item; and
  sending the highlight message to a user device associated with the user, wherein the highlight message causes the user device to automatically begin playback of the identified portion of the media content item without the user requesting the playback to begin.

11. The method of claim 10, further comprising:
  providing an indication to the user when the user does not have sufficient subscription level to access the highlight media.

12. The method of claim 11, further comprising:
  receiving an indication from the user to upgrade the user's subscription level.

13. The method of claim 10, wherein the indication of the highlight media includes at least one of an identifier for the highlight media, metadata associated with the highlight media, and the highlight media.

14. The method of claim 10, further comprising:
receiving an indication from the user that the user desires to access the highlight media; and
sending the highlight media to the user.

15. The method of claim 10, wherein the generating of the highlight message comprises generating the highlight message based on a unique identifier associated with the identified portion of the media content item, a start index associated with the identified portion of the media content item, and one of a duration and an end index associated with the identified portion of the media content item.

16. The method of claim 10, further comprising:
providing real-time statistical information to the user, the real-time statistical information related to one or more of the one or more players of interest.

17. The method of claim 10, wherein sending the highlight message to the user device includes sending the highlight media to the user device as streamed content.

18. The system of claim 1, wherein the feature extractor further uses speech recognition to generate the metadata.

19. The method of claim 10, further comprising using speech recognition to generate the metadata.

20. The system of claim 1, wherein the identified textual graphics comprise at least one of a jersey number associated with the player involved in the event and a name associated with the player involved in the event.

21. The system of claim 1, wherein the manager sends the highlight message to a user device associated with the user highlight message.

22. The method of claim 10, wherein the identified textual graphics comprise at least one of a jersey number associated with the player involved in the event and a name associated with the player involved in the event.

23. A method comprising:
storing a plurality of media content items related to a plurality of sporting events in a media database;
storing information about a plurality of players involved in the plurality of sporting events and an indication of one or more players of interest to a user that are included in the plurality of players in a user database;
identifying a portion of a media content item included in the plurality of media content items as associated with an event related to one of the sporting events;
determining an identity of a player involved in the event;
determining that the player involved in the event is included in the one or more players of interest; and
sending a highlight message to a user device associated with the user, wherein the highlight message causes the user device associated with the user to automatically begin playback of the identified portion of the media content item without the user requesting the playback to begin.

24. The method of claim 10, wherein the highlight message causes the user device to automatically begin playback of the identified portion of the media content item by causing the user device to display the identified portion of the media content item concurrently with a display of another sporting event that is unrelated to the event.

25. The method of claim 23, wherein the highlight message causes the user device to automatically begin playback of the identified portion of the media content item by causing the user device to display the identified portion of the media content item concurrently with a display of another sporting event that is unrelated to the event.

\* \* \* \* \*